Sept. 1, 1942.                J. G. JOACHIM                2,294,459
                            HINGE CONSTRUCTION
                           Filed Feb. 26, 1940
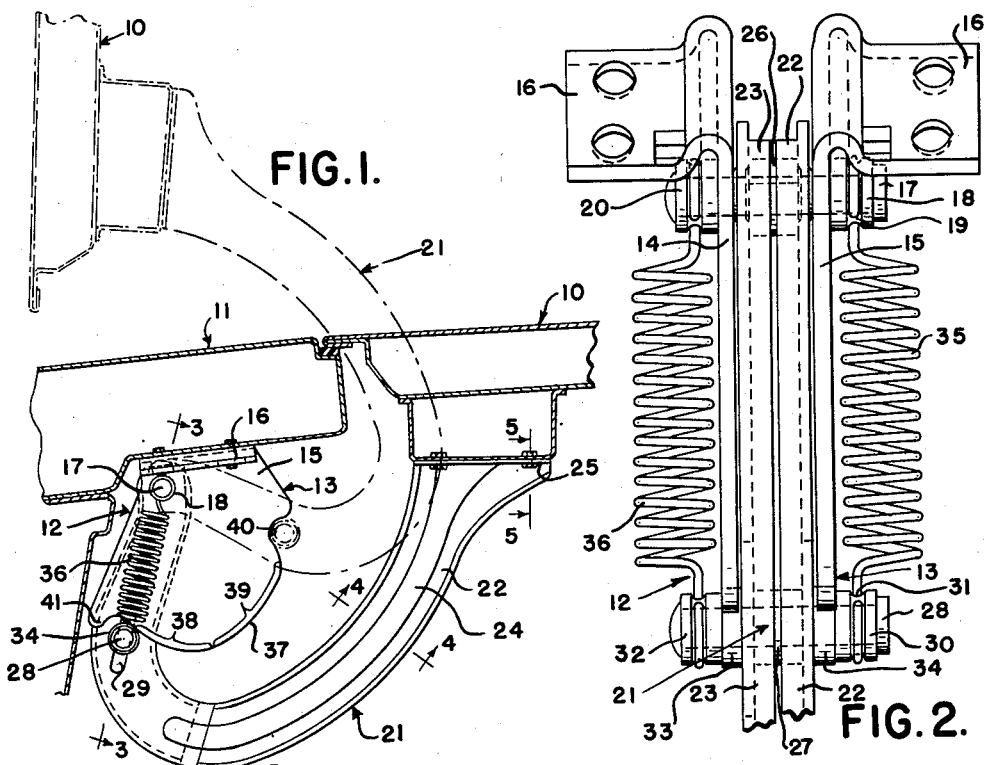
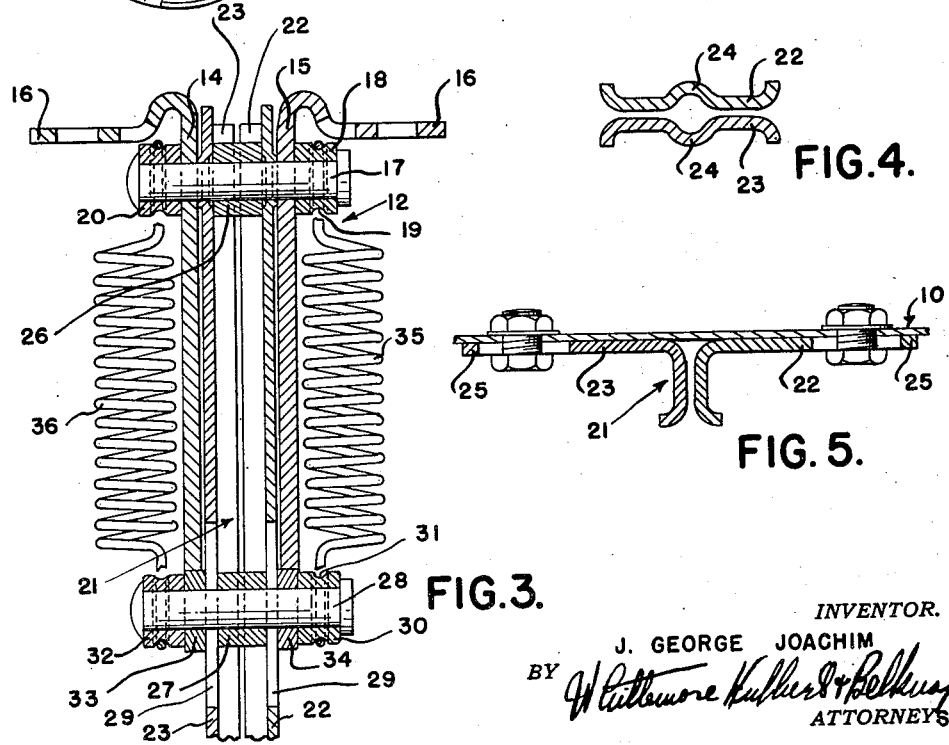
INVENTOR.
J. GEORGE JOACHIM
BY
ATTORNEYS Patented Sept. 1, 1942

2,294,459

UNITED STATES PATENT OFFICE 2,294,459

HINGE CONSTRUCTION

Joseph George Joachim, Detroit, Mich., assignor to Ferro Stamping & Manufacturing Company, Detroit, Mich., a corporation of Michigan Application February 26, 1940, Serial No. 320,930

6 Claims. (Cl. 16—135)

This invention relates generally to hinge constructions and refers more particularly to improvements in hinges of the type employed for supporting rear-deck closures of motor vehicle bodies.

It is one of the principal objects of this invention to provide a compact, concealed hinge so constructed as to occupy the minimum, usable space within the storage compartment and having relatively simple means combined therewith to effectively hold the closure in both open and closed positions.

Another object of this invention resides in the novel, relatively simple means associated with the hinge for assisting movement of the closure to both its open and closed positions relative to the vehicle body.

A further object of this invention resides in the provision of a hinge assembly embodying the above features and capable of being inexpensively manufactured, assembled and installed.

The foregoing, as well as other objects, will be made more apparent as this description proceeds, especially when considered in connection with the accompanying drawing, wherein:

Figure 1 is a fragmentary sectional view through a portion of a motor vehicle showing my improved hinge in side elevation;

Figure 2 is an end elevational view of the hinge assembly;

Figure 3 is a sectional view taken on the line 3—3 of Figure 1;

Figure 4 is a sectional view taken on the line 4—4 of Figure 1;

Figure 5 is a sectional view taken on the line 5—5 of Figure 1.

In Figure 1 of the drawing, I have illustrated a portion of a swinging closure 10 hingedly connected to a support 11 by means of my improved hinge assembly 12. This hinge assembly is particularly applicable to vehicle bodies for pivotally connecting the rear-deck closure on an adjacent part of the vehicle body, although it may be advantageously used in any installation embodying a relatively heavy, swinging closure.

In detail, the hinge assembly 12 has a fixed bracket 13 comprising a pair of laterally spaced plates 14 and 15 supported in parallel vertical planes on the support 11. As shown in Figure 2, the upper ends of the plates are bent laterally in opposite directions to form attaching flanges 16 suitably apertured to permit bolting or otherwise securing the same on the support 11. The two plates are held in assembled relationship by means of a headed pin 17 having a shank portion extending through aligned openings formed in the plates adjacent the upper end of the latter. Mounted on the pin 17 between the head on the latter and the adjacent plate 15 is a collar 18 having an annular groove 19 therein intermediate the ends thereof. A similar collar 20 is mounted on the free end of the pin in abutting relation to the plate 14 and the free end of the pin is peened over the outer end of the collar 20 to permanently secure the assembly together.

Pivotally supported on the pin 17 between the plates is the movable section of the hinge in the form of a closure supporting arm 21. The arm 21 is substantially U-shaped in elevation and comprises cooperating sheet metal sections in the form of stampings 22 and 23 arranged in juxtaposition. Both sections are reinforced in the manner indicated by the reference character 24 and the swinging ends of the sections are bent laterally in opposite directions to form attaching flanges 25 adapted to be secured to the closure 10.

The opposite ends of the sections project upwardly between the plates of the bracket 13 and are formed with aligned openings therethrough for receiving the pin 17. The metal around the apertures through the sections is embossed laterally outwardly to engage the adjacent surfaces of the plates and a suitable spacer 26 is mounted on the pin between the sections of the arm 21 to provide a slight space between the sections.

Cooperating with the spacer 26 to maintain the sections of the arm 21 in proper spaced relationship is a second spacer 27 mounted on a headed pin 28 having a shank portion extending through aligned vertically elongated slots 29 formed in the sections of the arm 21. Upon reference to Figure 3, it will be noted that a collar 30 having an annular groove 31 formed therein intermediate the ends thereof is mounted on the pin 28 adjacent the head on the latter and a similar collar 32 is mounted on the free end of the pin 28. The free end of the pin is peened over the adjacent end of the collar 32 to secure the parts in assembled relationship.

The slots 29 are so located in the sections of the arm 21 that the pin 28 extends through the sections below the bottom edges of the plates 14 and 15. A pair of rollers 33 and 34 are mounted on the pin 28 at opposite sides of the arm 21 and respectively engage the bottom edges of the plates 14 and 15. The rollers are yieldably urged into frictional contact with the bottom edges of the plates by means of springs 35 and 36 having loops at opposite ends thereof. The loops at opposite ends of the spring 35 are respectively received in the grooves 19 and 31 formed in the collars 18 and 30. The spring 36 is positioned at the opposite side of the bracket 13 and the looped opposite ends are respectively received in the grooves provided in the collars 20 and 32.

The bottom edges of both plates are predeterminedly contoured and form cam surfaces 37 for engagement with the rollers. The contour of the portions 38 of the cam surfaces is such as to cooperate with the spring influenced rollers to assist in moving the closure 10 to its closed position and yieldably maintain the closure in the latter position. The portions 39 of the cam surfaces, on the other hand, are contoured to cooperate with the springs and rollers to assist in moving the closure 10 to its open position shown by the dotted lines in Figure 1. The slots 29 are of sufficient length to permit the free vertical travel of the pin 28 relative to the arm 21 required to compensate for the irregular cam surfaces.

The movement of the closure 10 to its open position is positively limited by engagement of the rollers 33 and 34 in recesses 40 formed in the plates at the end of the portions 39 of the cam surfaces 37. Suitable stops 41 are also formed on the plates at the end of the cam surface portions 38 for engagement with the rollers. These stops, however, are merely for the purpose of preventing the springs from moving the rollers off the cam surfaces prior to installation of the assembly and are spaced a sufficient distance from the rollers in the closed position of the closure to permit the springs to exert a constant closing pressure on the closure when the latter is in its closed position shown by the full lines in Figure 1.

Thus, from the foregoing, it will be noted that I have provided a relatively simple, inexpensive hinge having means for not only holding the closure in both its open and closed positions but, in addition, having provision for assisting movement of the closure to both of these positions. It will further be noted that the relatively few simple parts of the hinge form an assembly capable of being readily installed as a unit and when installed occupies very little, if any, usable space.

What I claim as my invention is:

1. A hinge for connecting a closure to a fixed support comprising, a bracket secured to the fixed support and provided with laterally spaced substantially parallel plates having contoured edges forming cam surfaces, an arm having one end extending between the plates and supported to permit swinging movement of the arm relative to said plates, cam follower means mounted on each of the opposite sides of the arm beyond the contoured edges of the plates for sliding movement toward and away from said edges, spring means urging said follower means into engagement with the contoured edges of the plates whereby said follower means travels along the contoured edges of the plates upon swinging the arm in opposite directions relative to the plates, the cam surfaces formed by the contoured edges of the plates being complementary and shaped to coact with the spring influenced follower upon initial movement of the arm in one direction relative to the plates to assist continued movement of the arm in said one direction.

2. A hinge for closures comprising, a fixed bracket provided with laterally spaced plates having contoured edges, an arm having one end extending between the plates and pivotally supported to permit swinging movement of the arm relative to the plates, follower means mounted on each of the opposite sides of the arm beyond the contoured edges of the plates for sliding movement toward and away from said contoured edges, spring means normally urging the follower means into frictional engagement with the contoured edges of the plates whereby said follower means travels along the contoured edges of the plates upon swinging the arm in opposite directions relative to the plates, said contoured edges of the plates forming complementary cam surfaces and each cam surface having differentially contoured cam portions forming continuations of one another, one of said cam portions having a contour predetermined to cooperate with the spring influenced follower means upon initial swinging movement of the arm in one direction to assist continued movement of the arm in said one direction, and the other of said cam portions having a contour predetermined to cooperate with the spring influenced follower means upon swinging movement of said arm in the other direction to assist continued movement of the arm in said other direction.

3. A hinge for closures comprising, a fixed bracket provided with laterally spaced plates having contoured edges, a generally U-shaped arm having one end extending between the plates and pivotally mounted on the plates to permit swinging movement of the arm relative thereto, a transverse pin extending through the arm beyond the contoured edges of the plates and movable toward and away from the contoured edges of the plates, a follower mounted on the pin at each side of the arm and having a rolling engagement with the contoured edge of the adjacent plate, springs on opposites sides of the plates having the opposite ends respectively mounted on the plates and connected to the ends of the pin for urging the follower into frictional engagement with the contoured edges of said plates whereby the follower travels along the contoured edges of the plates upon swinging the arm in opposite directions, said contoured edges forming complementary cam surfaces contoured to coact with the spring influenced follower upon initial movement of the arm in one direction relative to the plates to assist continued movement of the arm in said one direction.

4. A hinge for closures comprising a fixed bracket provided with laterally spaced plates having contoured edges, a substantially U-shaped arm composed of juxtapositioned complementary stampings and having one end portion extending between the plates, a pin extending transversely through the plates and through sections of the arm at the said one end of the latter for pivotally mounting the arm on the bracket, a spacer mounted on the pin between the sections of the arm to hold said sections in positions against the adjacent sides of the plates, a second pin extending transversely through the sections of the arm beyond the contoured edges of the plates and slidable toward and away from said contoured edges, a spacer mounted on the second pin between the complementary sections of the arm, rollers also mounted on the pin at the outer sides of the complementary sections of the arm, a pair of springs positioned at opposite sides of the plates and having the opposite ends respectively connected to the free end portions of said pins to yieldably urge the rollers into frictional engagement within the contoured edges of the plates, said contoured edges of the plates forming complementary cam surfaces having portions coacting with the spring influenced rollers to assist swinging movement of said arm.

5. A hinge for connecting a closure to a fixed support comprising, a bracket having two parts secured together in lateral spaced relation by means including a transverse pin and having contoured edges forming a cam surface, an arm having one end directly connected to the closure and having the opposite end extending between the parts of the bracket and pivotally mounted on said pin, a cam follower mounted on each of the opposite sides of the arm for sliding movement in directions toward and away from the contoured edges of the bracket parts and respectively engageable with said contoured edges, spring means urging the follower members into engagement with the respective contoured edges on the bracket parts whereby the followers are compelled to travel along the respective contoured edges on the bracket parts upon swinging the arm in opposite directions relative to the bracket parts, the cam surface formed by said contoured surface being shaped to coact with the spring influenced followers upon initial movement of the arm in one direction to assist continued movement of the arm in said one direction.

6. A hinge for connecting a closure to a fixed support comprising, a bracket having two stampings secured together in lateral spaced relation by means including a transverse pin and having contoured edges forming cam surfaces, an arm having one end connected to the closure and having the opposite end extending between the stampings and pivotally mounted on said pin, a second pin extending transversely through the arm beyond the contoured edges of the stampings and slidable relative to the arm toward and away from said contoured edges, a follower mounted on the second pin at each side of the arm and respectively engageable with said contoured edges, a pair of springs positioned on opposite sides of the stampings and having the opposite ends respectively connected to the free ends of the two pins for yieldably urging the followers into engagement with their respective contoured edges, said contoured edges being shaped to provide complementary cam surfaces having portions coacting with the spring influenced followers to assist swinging movement of said arm.

J. GEORGE JOACHIM.